UNITED STATES PATENT OFFICE.

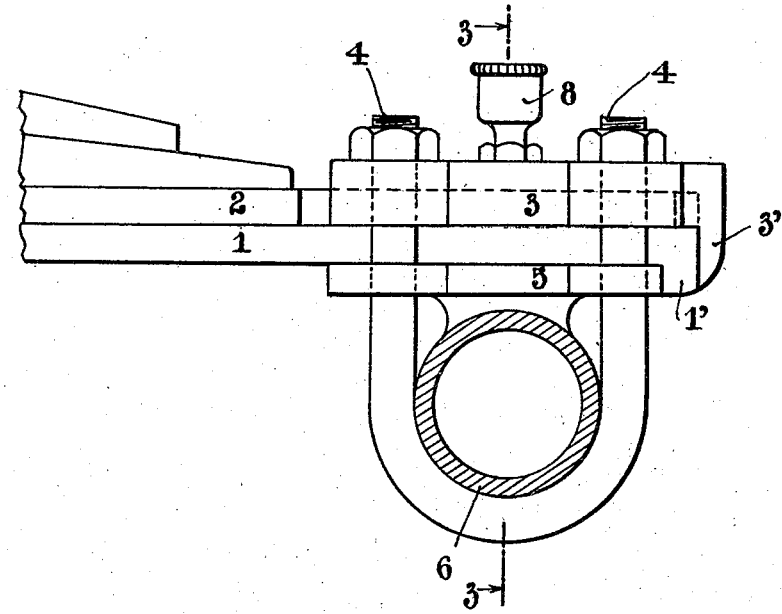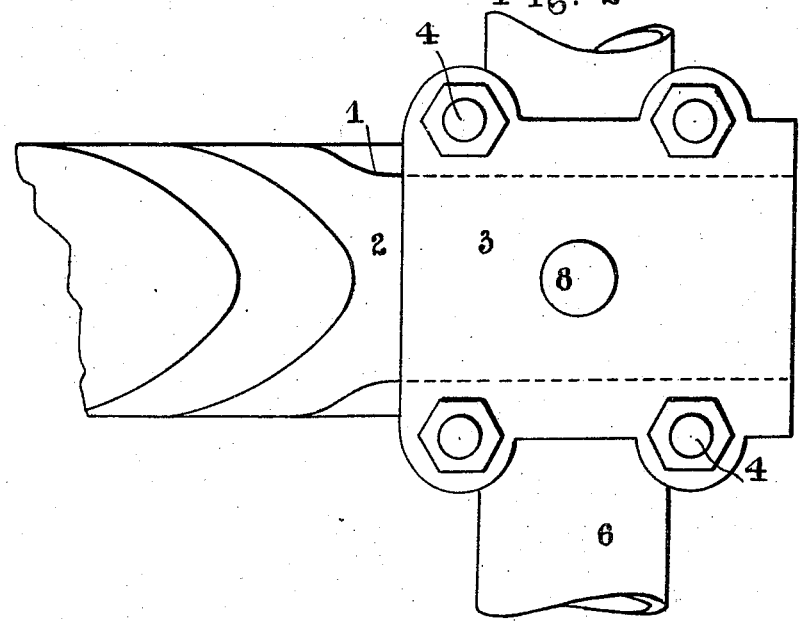

ACHILLE LÉON FRANCOIS WATTEL, OF SEVRES, FRANCE.

DEVICE FOR ATTACHING THE SUSPENSION SPRINGS OF AUTOMOBILES.

1,419,788.

Specification of Letters Patent. Patented June 13, 1922.

Application filed July 31, 1920. Serial No. 400,556.

*To all whom it may concern:*

Be it known that I, ACHILLE LÉON FRANCOIS WATTEL, a citizen of the French Republic, residing at 22 Avenue de Bellevue, Sevres, in the Department of Seine and Oise, France, have invented a new and useful Improvement in Devices for Attaching the Suspension Springs of Automobiles, of which the following is a specification.

The object of the present invention is to reduce the reaction-strains (due to application of the brakes, turning corners, starting, uneven roads) which are borne by the main-plate of the springs in cases where the principle of absorbing all shocks by the springs is employed. It thus enables breakage of the spring-plates to be avoided, permits of retaining an elastic suspension in view of the fact that it is no longer necessary to increase the sections of the plates, in order to take care of these extra loads.

My invention will be understood after reference to the accompanying drawings, in which like parts are indicated by similar reference symbols throughout the several views, and in which:—

Figure 1 is a side view of a spring of the cantilever type constructed according to the invention.

Figure 2 is a plan thereof and

Figure 3:
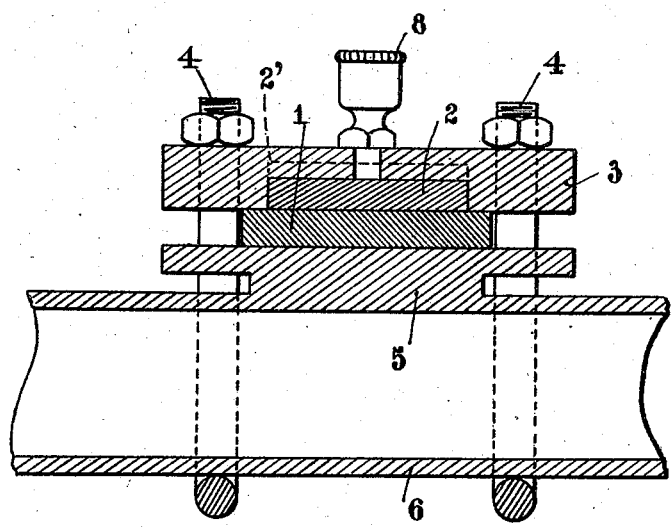
Figure 3 is a section along line 3—3 of Figure 1.
Figure 4:
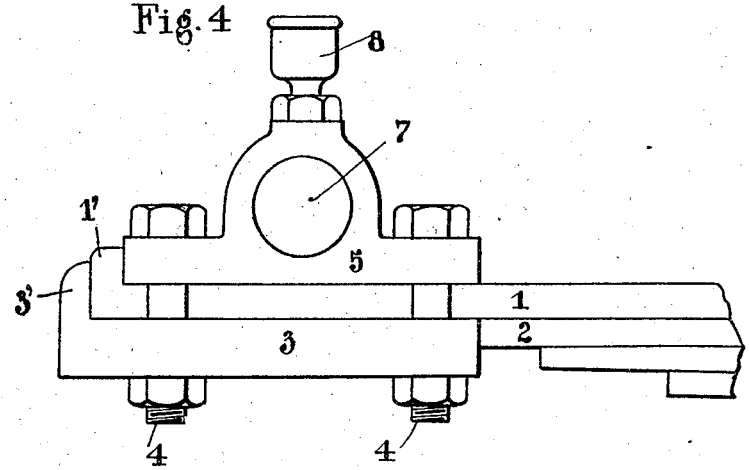
Figure 4 is a side view of an ordinary spring, mounted in accordance with the invention.

The following description applies equally to the case of Figures 1, 2 and 3 as to that of Figure 4.

The main-plate 1 is flat for a certain portion of its extremity and the end thereof is bent so as to form a heel-piece 1'.

The plate 2 is also flat at its extremity which covers the main plate but its width is decreased by a certain amount on each side of this flat portion.

A flange plate 3 comprises a recess which permits of the flat portion of the plate 2 to seat therein without wedging, and also, by tightening up the bolts 4, to clamp the main plate 1 onto the spring-block 5 of the axle 6. The flange plate 3 carries at one end a heel-piece 3' which clamps the heel-piece 1' of the main-plate against the block 5 so as to prevent the main-plate from sliding between the block 5 and the flange 3.

A lubricator 8 is provided for ensuring lubrication of the portions of the plate 2 in contact with the flange plate 3 and the main plate 1.

The method of operation is as follows: The main-plate 1 of the spring is held by the flange plate 3, while the plate 2, being lubricated by the lubricator 8, slides in its seat in the flange plate 3 in accordance with the flexure of the spring. But in order to withstand the lifting or rearing couple which arises when starting or upon application of the brakes, and to resist the torsional strains when turning corners, and thus to give greater stability, the section of the plate 2 adds itself to that of the main-plate 1.

The suppleness of the spring is not affected by this device, since the plate 2 can slide freely.

Besides the plate 2, a second or even a number of plates could be prolonged, always provided that such prolongations are guided in the clamping flange plate in such a manner as to be capable of sliding therein and that the main-plate is rigidly clamped by its edges to the block 5. The position of a second plate similar to plate 2 is indicated in dotted lines at 2' in Figure 3.

The invention has been described merely by way of example and in no way limitatively, and it is obvious that modifications in details may be made without departing from the spirit of the invention.

I claim:

1. In a spring attachment for vehicles the combination with the axle and a spring block attached thereto, of a main spring plate mounted above said spring block and provided with a downwardly depending lug adapted to engage over the edge of said spring block, a second spring plate mounted to slide over said main spring plate and of less width than the said main spring plate, a flange plate mounted above said axle and provided with a lug overlapping the end of the main spring plate, and also provided with a groove adapted to receive the reduced portion of said second spring plate and having its lower face adapted to bear on the upper face of said main spring plate, with U-bolts engaging said axle and projecting up through said flange plate exterior to the upper edges of said main spring plate, and nuts on said U-bolts firmly locking said flange plate, said spring plate, said axle and said main plate together, substantially as and for the purpose described.

2. In a spring attachment for vehicles the combination with the axle and a spring block attached thereto, of a main spring plate mounted above said spring block and provided with a downwardly depending lug adapted to engage over the edge of said spring block, a second spring plate mounted to slide over said main spring plate and of less width than the said main spring plate, a flange plate mounted above said axle and provided with a lug overlapping the end of said main spring plate, and also provided with a groove adapted to receive the reduced portion of said second spring plate and having its lower face adapted to bear on the upper face of said main spring plate, with bolts engaging said axle and projecting up through said flange plate exterior to the upper edges of said main spring plate, nuts on said bolts firmly locking said flange plate, said spring plate, said axle and said main plate together, and a lubricating cup mounted above said flange plate and opening downwards therethrough and lubricating the said parts beneath, whereby said spring plate is free to slide beneath said flange plate and above said main spring plate, substantially as and for the purpose described.

ACHILLE LÉON FRANCOIS WATTEL.

Witnesses:
A. V. DAVIES,
H. R. BANHAM.